(12) United States Patent
Huang

(10) Patent No.: US 6,843,021 B1
(45) Date of Patent: Jan. 18, 2005

(54) FLOATABLE PLANT CULTIVATION DEVICE

(76) Inventor: Shih-Ming Huang, No. 43, Sec. 3, Rehe Rd., Beitun District, Taichung 406 (TW)

( * ) Notice: Subject to any disclaimer, the term of this patent is extended or adjusted under 35 U.S.C. 154(b) by 0 days.

(21) Appl. No.: 10/795,305

(22) Filed: Mar. 9, 2004

(51) Int. Cl.[7] ............................................. A01G 31/00
(52) U.S. Cl. ................................... 47/63; 47/60; 47/86
(58) Field of Search ........................... 47/59 R, 60, 61, 47/63, 65.5, 86, 87, 65; 119/221, 222, 239, 240

(56) References Cited

U.S. PATENT DOCUMENTS

| | | | | |
|---|---|---|---|---|
| 3,889,416 A | * | 6/1975 | Bergeron et al. | 47/86 |
| 3,927,491 A | * | 12/1975 | Farnsworth | 47/63 |
| 4,034,506 A | * | 7/1977 | Kasahara et al. | 47/64 |
| 4,312,152 A | * | 1/1982 | Drury et al. | 47/63 |
| 4,513,533 A | * | 4/1985 | Gething et al. | 47/63 |
| 5,836,108 A | * | 11/1998 | Scheuer | 47/65 |

* cited by examiner

Primary Examiner—Teri P. Luu
Assistant Examiner—T. Nguyen
(74) Attorney, Agent, or Firm—Rosenberg, Klein & Lee (57) ABSTRACT

A floatable plant cultivation device includes a plurality of hollow floatable parts and each floatable part has a pot engaged with a first passage in a center of the floatable part. The pot receives a plant therein. The multiple floatable parts are connected with each other by a plurality of connection members. Each connection member includes several engaging ends which are engaged with second passages defined in different floatable parts.

9 Claims, 8 Drawing Sheets

FLOATABLE PLANT CULTIVATION DEVICE

The present invention relates to a plant cultivation device that is floatable and supports a plant pot. Several connection members connect multiple plant cultivation devices together.

BACKGROUND OF THE INVENTION

Two conventional plant cultivation beds known to applicant are disclosed in U.S. Pat. Nos. 6,014,838 and 5,675,933. Each of the prior references discloses a device that includes several holes for receiving a plant pot. The device in U.S. Pat. No. 6,014,838 has a ring that has a fixed size and includes seven holes for supporting the plant pots. The ring cannot be separated into small parts to be put in a small pond. Besides, if the pots are not put in a balance arrangement in the holes of the device, the device could tilt and the plants in the pots are tilt and affected adversely. U.S. Pat. No. 5,675,933 discloses an even bulky device and is not used for cultivation of water plants.

The present invention intends to provide a floatable plant cultivation device that has a plant pot at a center thereof and multiple devices can be connected with each other by connection members.

SUMMARY OF THE INVENTION

The present invention relates to a floatable plant cultivation device which comprises a plurality of floatable parts each having a first passage in a center thereof so as to receive a pot therein, and a plurality of second passages are located around the first passage and defined through the floatable part corresponding thereto. A plurality of connection members each have a plurality of engaging ends which are engaged with two second passages of different floatable parts.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the floatable plant cultivation device of the present invention comprises a plurality of floatable parts 10 and each floatable part 10 has a hollow interior so that it is floatable on water. Each floatable part 10 has a first passage 12 defined through a center thereof and a plurality of second passages 11 are located around the first passage 12 and defined therethrough. Each first passage 12 includes an upper partition and a lower partition, and each of the upper and lower partitions has a tapered inner periphery. The tapered inner peripheries of the upper partition and the lower partition are inversely arranged with each other. A flange 120 extends inward from an inner periphery of the first passage 12 and is located at a conjunction of two respective narrow ends of the upper partition and the lower partition. Each second passage 11 is similar to the first passage 12 and includes an upper partition and a lower partition of the same arrangement. A flange 110 extends inward from an inner periphery thereof and is located at a conjunction of two respective narrow ends of the upper partition and the lower partition.

Figure 1:
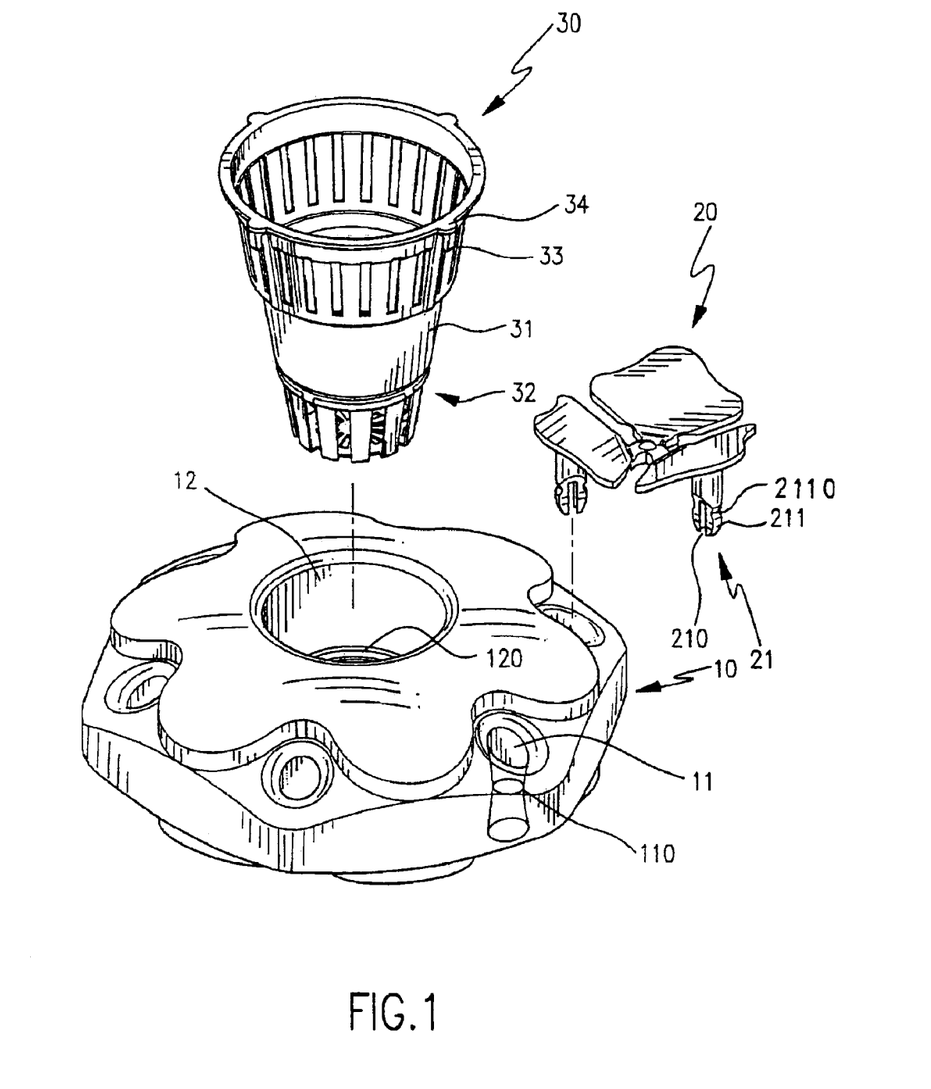
FIG. 1 is an exploded view to show the floatable plant cultivation device scooter of the present invention.
Figure 2:
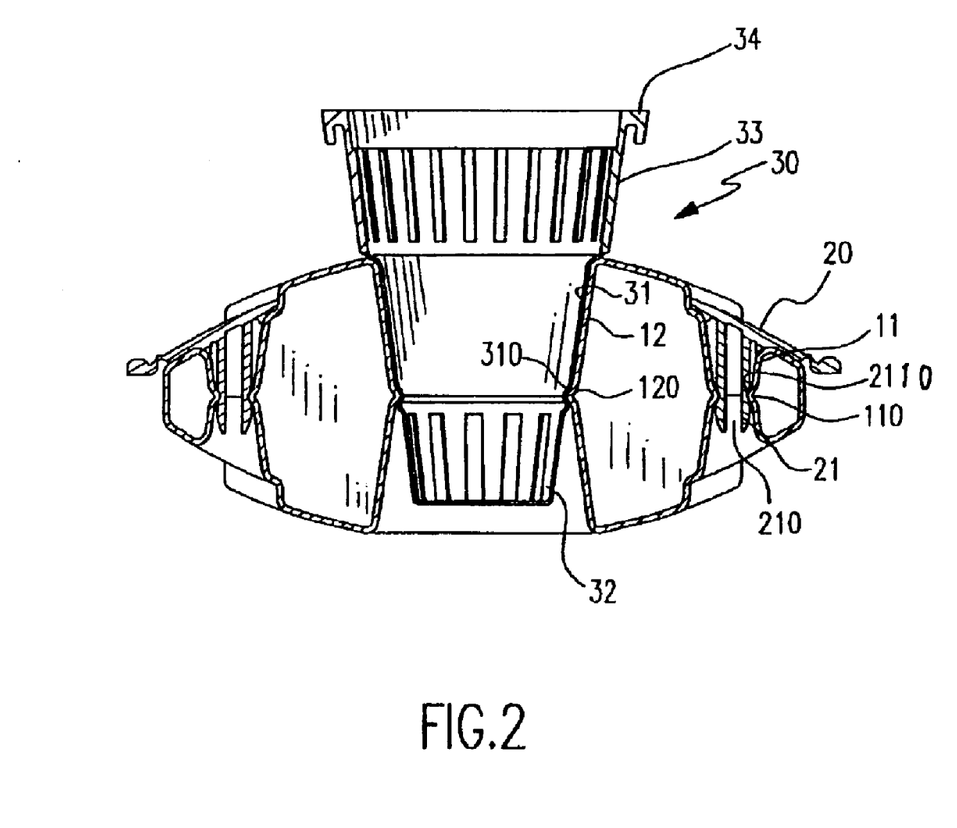
FIG. 2 is a cross sectional view to show the connection of the floatable part, the pot and the connection member.
Figure 3:
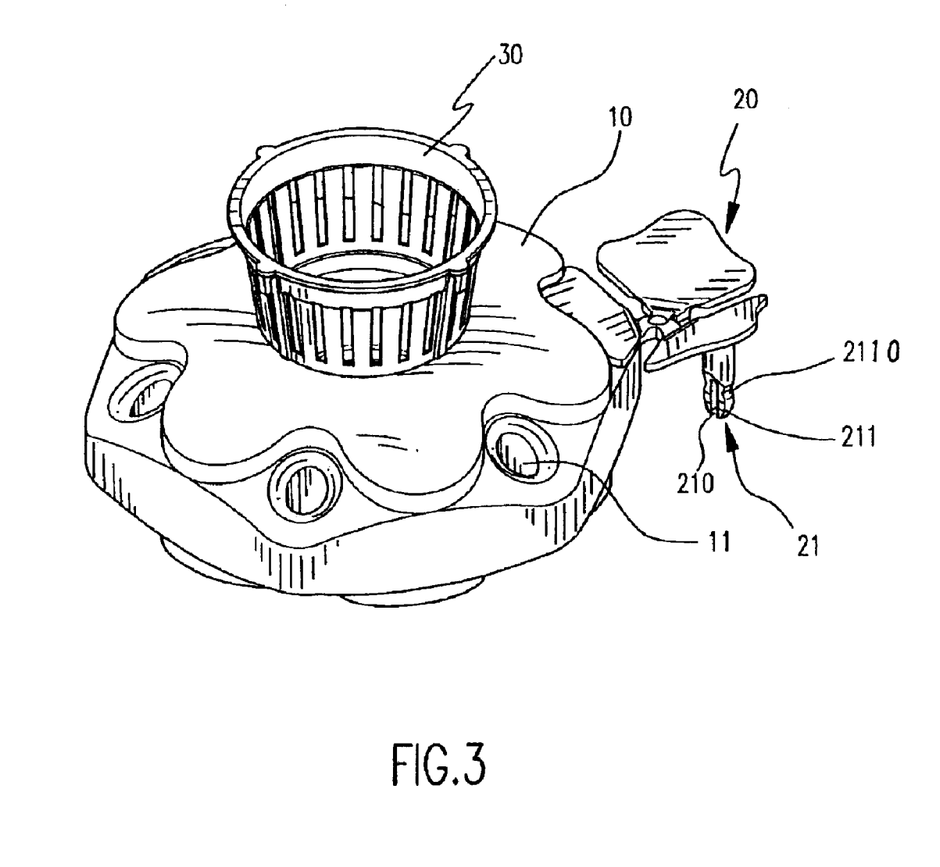
FIG. 3 shows a perspective view of the floatable part with one pot and one connection member connected thereto.
Figure 4:
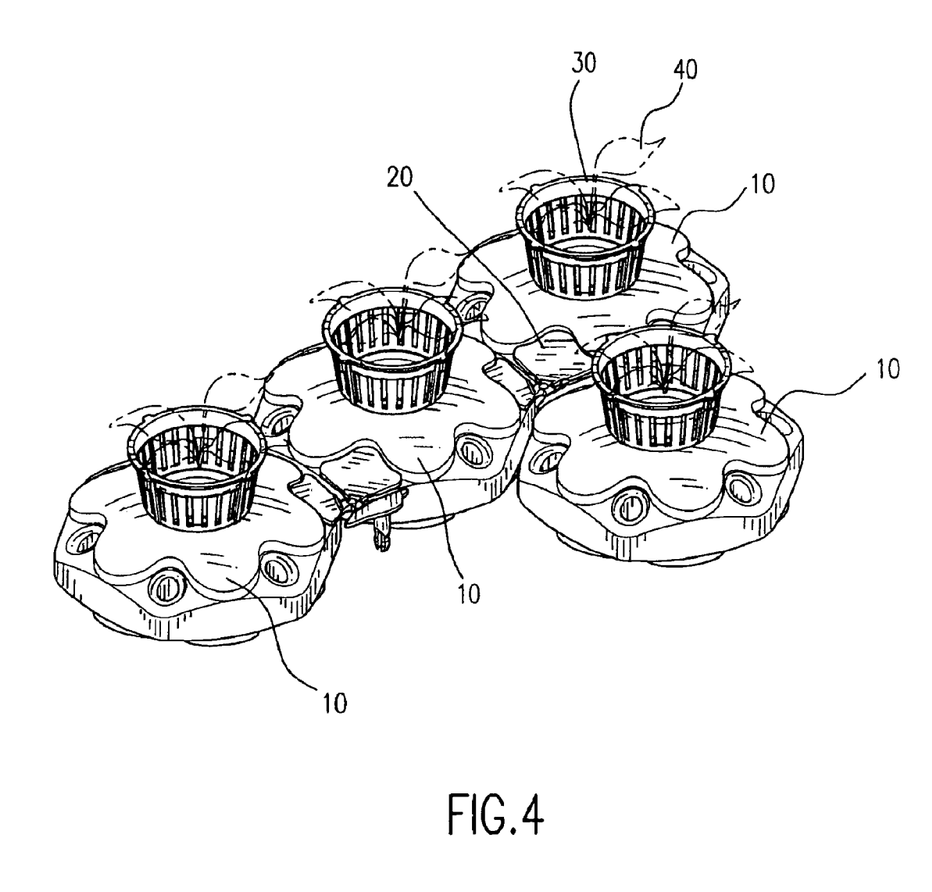
FIG. 4 shows four floatable parts connected with each other.

A plurality of connection members 20 each have three plates which are connected with each other. Each plate has one extension extending from an underside thereof and an engaging end 21 is connected to a distal end of the extension. Each engaging end 21 including two lugs 211 with a gap 210 defined therebetween, such that the two lugs 211 can be pushed toward each other. Each lug 211 includes a notch 2110 on an outside thereof such that the notches 2110 of the two lugs 211 of each engaging end 21 are engaged with the first flange 110 when the engaging end 21 is inserted in the second passage 11. By the engaging ends 21 which are engaged with second passages 11 of individual floatable parts 10, multiple number of the floatable parts 10 can be connected with each other as shown in FIG. 4.

A plurality of pots 30 are respectively engaged with the respective first passages 12, and each pot 30 has slots defined through a wall thereof so as to allow water flowing therethrough. An annular groove 310 is defined in an outer periphery of each of the pots 30 so that the flange 120 in each of the first passages 12 can be engaged with the annular groove 310.

The outer periphery of each pot 30 is a tapered outer periphery and includes an upper portion 33 with a plurality of slots defined therethrough, a close area 31 and a lower portion 32 with a plurality of slots defined therethrough. A porous bottom is connected to the lower portion. A diameter of the close area 31 is smaller than a diameter of the upper portion 33 so as to form a shoulder portion which is engaged with an annular edge of the first passage 12 define in a top surface of the floatable part 10. A lip 34 extending outward from a top edge of the top portion 33 of the pot 30 so that the pot 30 is easily to be carried by the users. A plant 40 is put in the pot 30.

Figure 5:
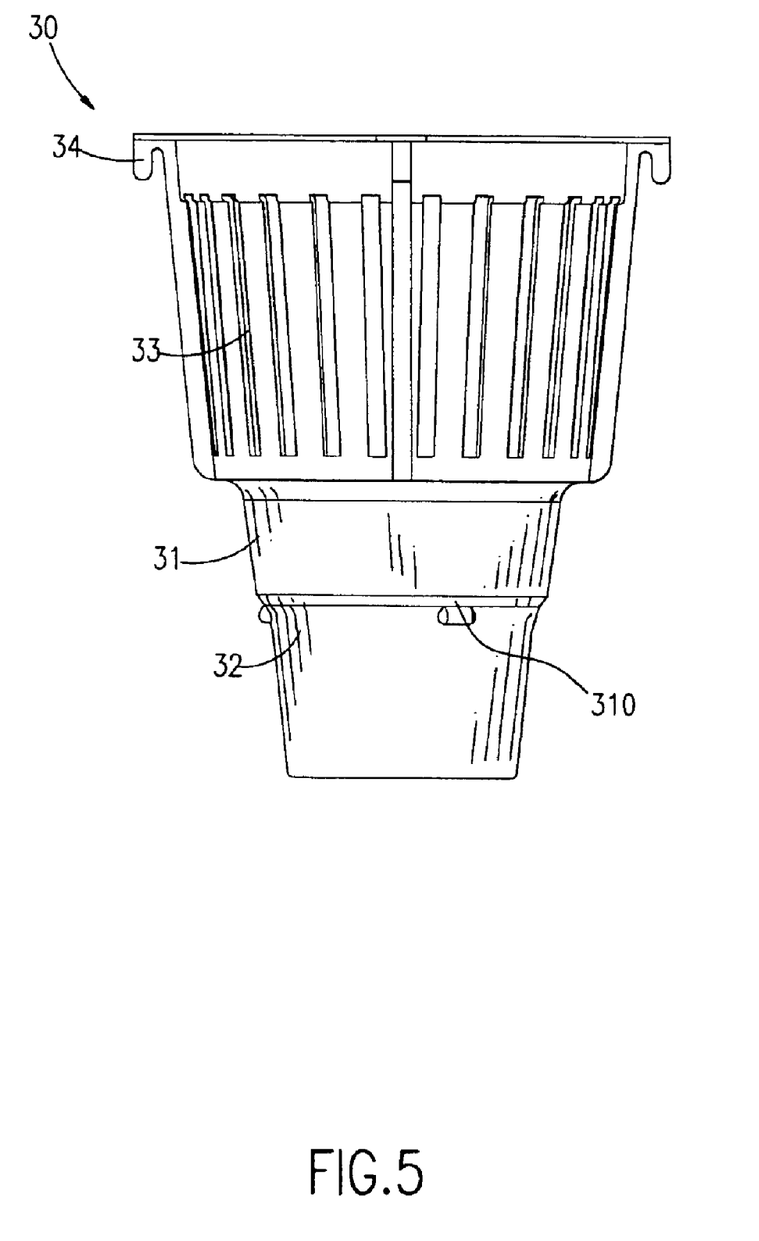
FIG. 5 is a side view of another embodiment of the pot.
Figure 6:
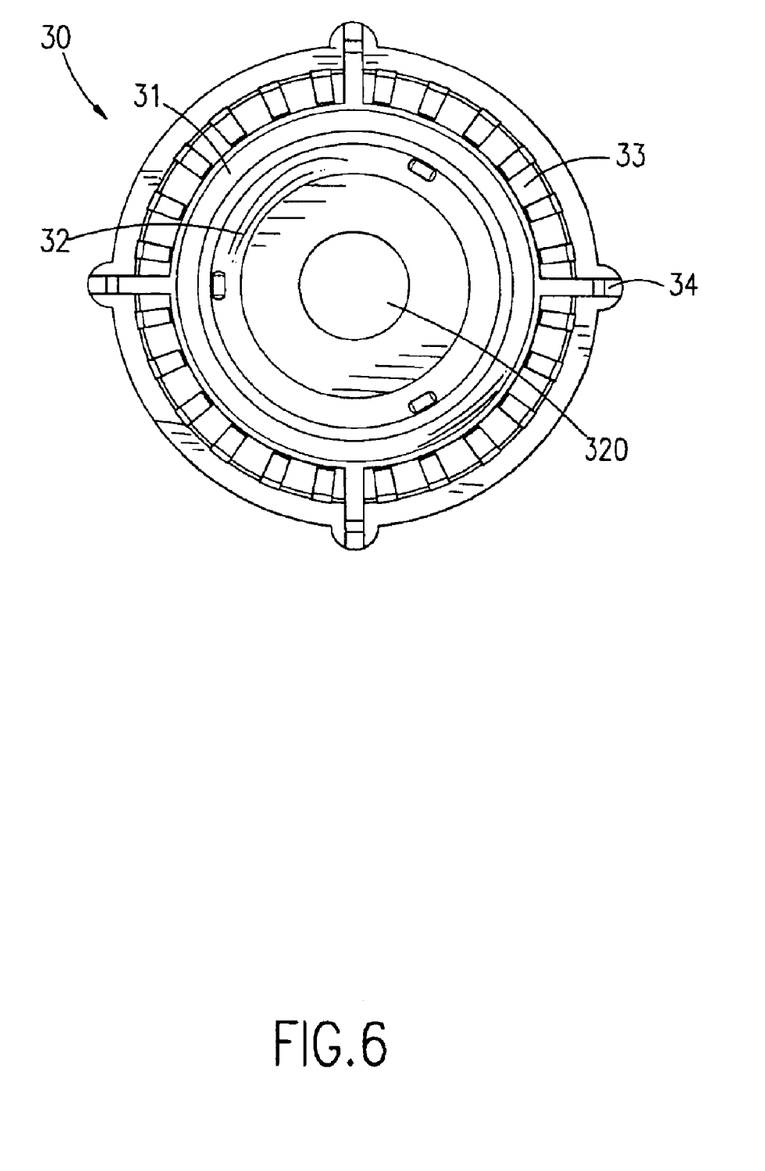
FIG. 6 is a top view to show the pot as shown in FIG. 5.

Referring to FIGS. 5 and 6 showing another embodiment of the pot 30, wherein each pot 30 includes a periphery that includes an upper portion 33 with a plurality of slots defined therethrough, a close area 31 and a close lower portion 32. A bottom with a central hole 320 is connected to the lower portion 32. A diameter of the close area 31 is smaller than a diameter of the upper portion 33 so as to form a shoulder portion which is engaged with an annular edge of the first passage 12 define in a top surface of the floatable part 10. A lip 34 extends outward from a top edge of the top portion 33.

Figure 7:
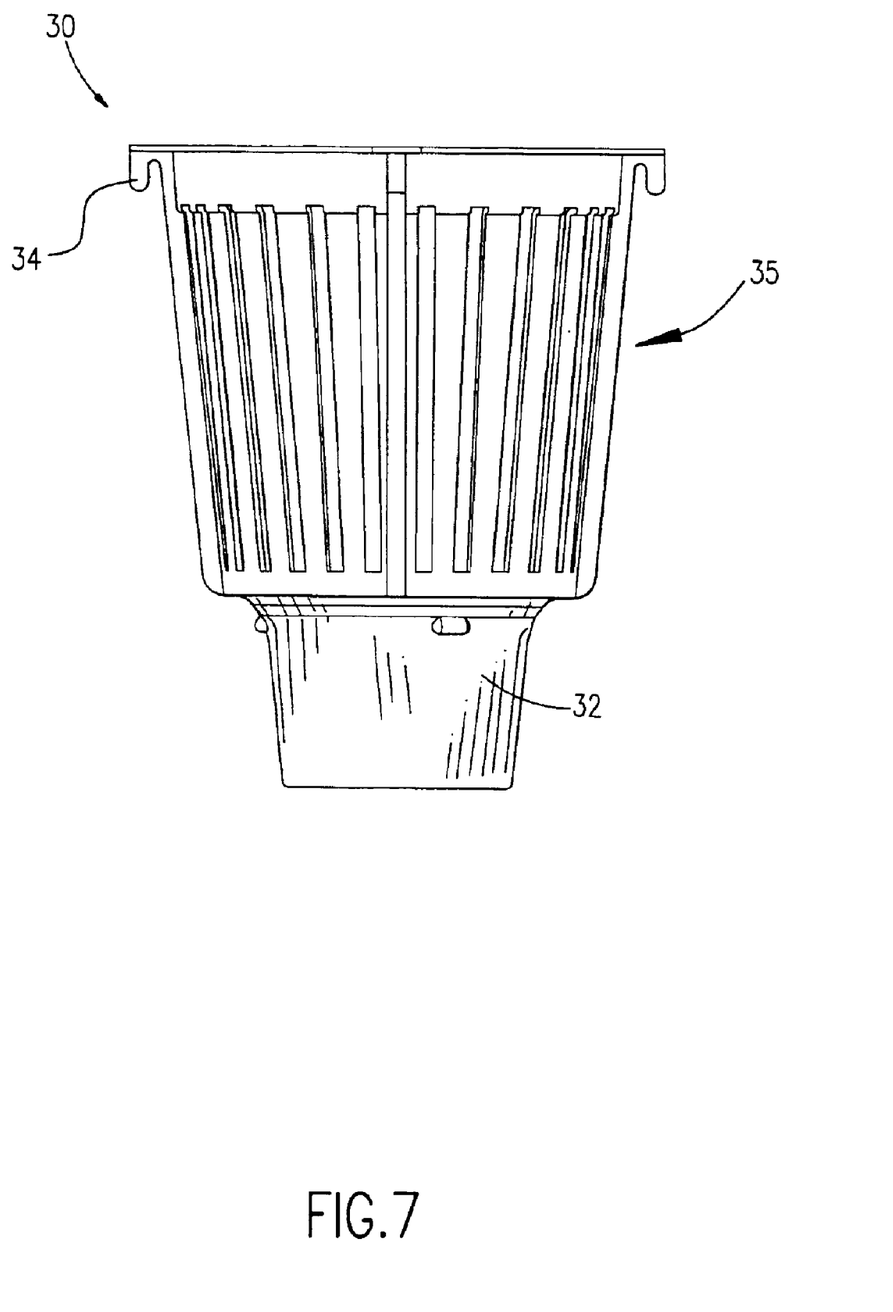
FIG. 7 is a side view of yet another embodiment of the pot.
Figure 8:
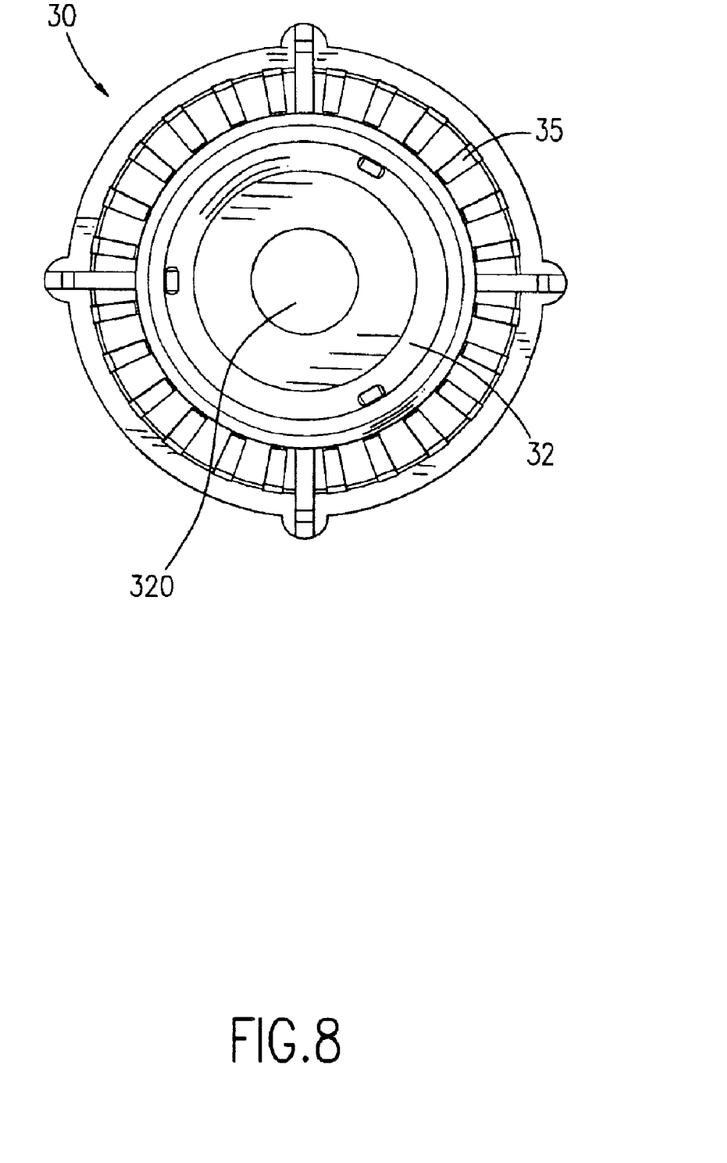
FIG. 8 is a top view to show the pot as shown in FIG. 7.

Referring to FIGS. 7 and 8 showing yet another embodiment of the pot 30, wherein each pot 30 includes a periphery that includes an upper portion 35 with a plurality of slots defined therethrough and a close lower portion 32. A bottom with a central hole 320 is connected to the lower portion 32. A diameter of the close lower portion 32 being smaller than a diameter of the upper portion 35 so as to form a shoulder portion which is engaged with an annular edge of the first passage 12 define in a top surface of the floatable part 10. A lip 34 extends outward from a top edge of the top portion 35.

While we have shown and described the embodiment in accordance with the present invention, it should be clear to those skilled in the art that further embodiments may be made without departing from the scope of the present invention.

What is claimed is:

1. A floatable plant cultivation device comprising:

a plurality of floatable parts each having a first passage defined through a center thereof and a plurality of second passages located around the first passage and defined through the floatable part corresponding thereto;

a plurality of connection members each having a plurality of engaging ends which are engaged with second passages of individual floatable parts, each engaging end connected to a distal end of one of extensions extending from an underside of each of the connection members, each engaging end including two lugs with a gap defined therebetween and each lug including a notch on an outside thereof, each second passage including a first flange extending inward from an inner periphery thereof so that the notches of the two lugs of each engaging end are engaged with the first flange, and a plurality of pots respectively engaged with the respective first passages, each pot having slots defined through a wall thereof.

2. The device as claimed in claim 1, wherein an annular groove is defined in an outer periphery of each of the pots and each first passage has a second flange extending inward from an inner periphery thereof, the second flange being engaged with the annular groove.

3. The device as claimed in claim 2, wherein the outer periphery of each pot is a tapered outer periphery and each first passage includes an upper partition and a lower partition, each of the top and lower partitions having a tapered inner periphery, the second flange located at a conjunction of two respective narrow ends of the upper partition and the lower partition.

4. The device as claimed in claim 1, wherein each pot includes a periphery that includes an upper portion with a plurality of slots defined therethrough, a close area and a lower portion with a plurality of slots defined therethrough, a porous bottom connected to the lower portion, a diameter of the close area being smaller than a diameter of the upper portion so as to form a shoulder portion which is engaged with an annular edge of the first passage define in a top surface of the floatable part.

5. The device as claimed in claim 1, wherein each pot includes a periphery that includes an upper portion with a plurality of slots defined therethrough, a close area and a close lower portion, a bottom with a central hole being connected to the lower portion, a diameter of the close area being smaller than a diameter of the upper portion so as to form a shoulder portion which is engaged with an annular edge of the first passage define in a top surface of the floatable part.

6. The device as claimed in claim 1, wherein each pot includes a periphery that includes an upper portion with a plurality of slots defined therethrough and a close lower portion, a bottom with a central hole being connected to the lower portion, a diameter of the close lower portion being smaller than a diameter of the upper portion so as to form a shoulder portion which is engaged with an annular edge of the first passage define in a top surface of the floatable part.

7. The device as claimed in claim 1 further comprising a lip extending outward from a top edge of the top portion of the pot.

8. The device as claimed in claim 1, wherein each of the floatable parts has a hollow interior.

9. The device as claimed in claim 1, wherein each of the connection members composed of at least two plates which are connected with each other, each one of the at least two plates having one engaging end.

* * * * *